March 3, 1936. C. E. KEEFER ET AL Re. 19,878
SEWAGE TREATING APPARATUS
Original Filed June 9, 1931 2 Sheets-Sheet 1
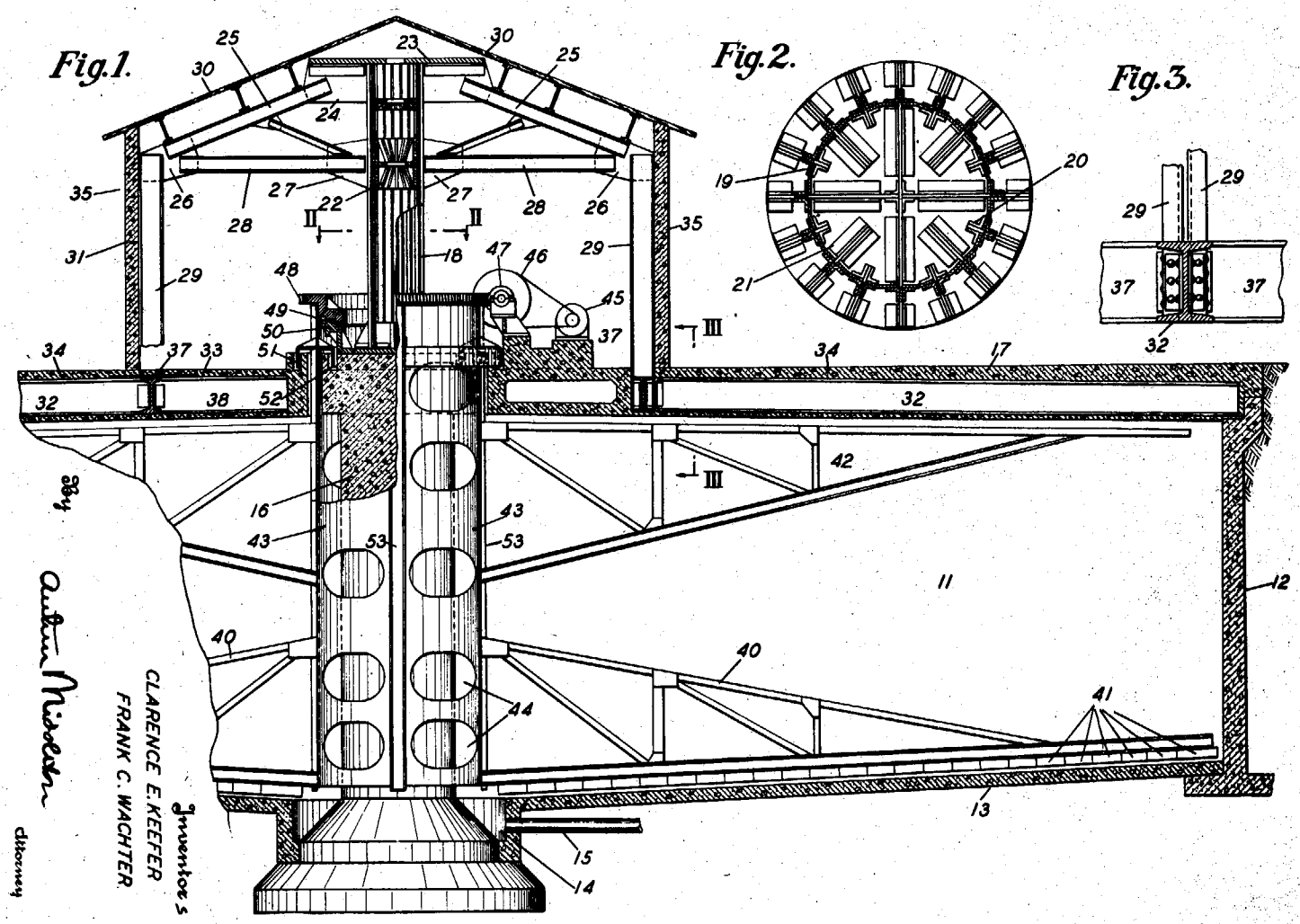

March 3, 1936. C. E. KEEFER ET AL Re. 19,878

SEWAGE TREATING APPARATUS

Original Filed June 9, 1931 2 Sheets-Sheet 2

Inventors

CLARENCE E. KEEFER
FRANK C. WACHTER

By Arthur Nissedon

Attorney

Reissued Mar. 3, 1936 Re. 19,878

UNITED STATES PATENT OFFICE 19,878

SEWAGE TREATING APPARATUS

Clarence E. Keefer and Frank C. Wachter, Baltimore, Md., assignors to The Dorr Company, Inc., New York, N. Y., a corporation of Delaware Original No. 1,892,688, dated January 3, 1933, Serial No. 543,131, June 9, 1931. Application for reissue October 21, 1933, Serial No. 694,648

16 Claims. (Cl. 210—2)

Figure 4:
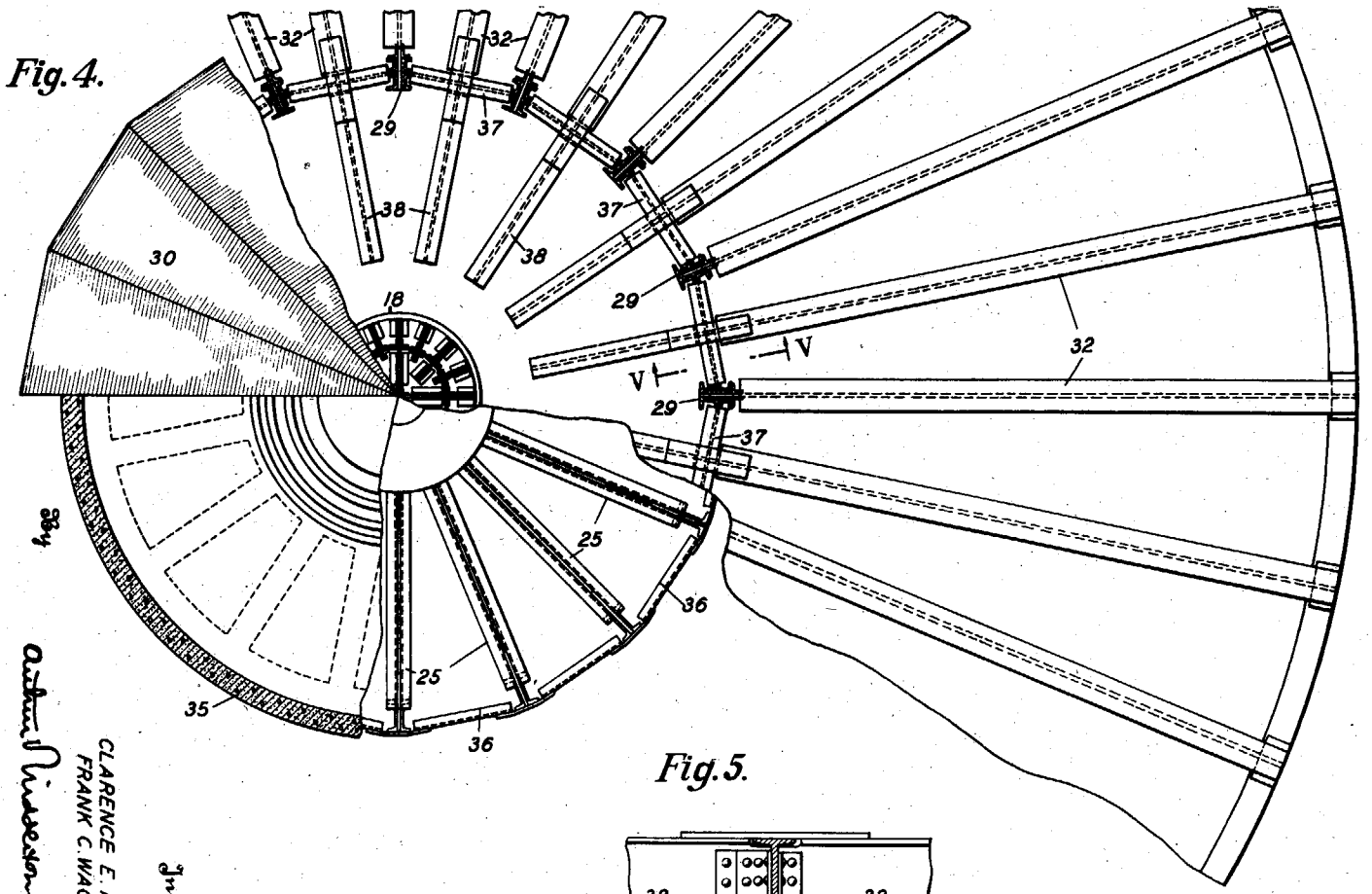

In the treatment of sewage and the like, the putrescible solids therein are separated therefrom in the form of sludge, usually by sedimentation means. This sludge, as a step in its treatment to render it inert and odorless, is exposed to anaërobic bacterial action in a digester. This invention relates among other things, to the construction of such a digester.

Sewage digesters comprise generally a covered sedimentation tank having driven mechanisms therein for impelling solids settling in the tank, to a sludge discharge outlet. These mechanisms are sometimes propelled through the medium of a vertical shaft in the digester which extends above the digester cover to be driven by a suitable motor and gearing. A trussed bridge extends across the top of the digester tank for supporting the upper end of the vertical shaft and for supporting the driving motor mechanism.

With the present tendency toward beautifying sewage treating plants, it has become desirable to redesign the digesters used therein to eliminate therefrom the present unsightly truss construction. Therefore one object of this invention is to meet that requirement in digesters or sedimentation apparatus.

However, to eliminate the trusses is not as easy as it may appear because it has entailed a redesign and a rearrangement of many of the digester elements. Accordingly this invention may be said to comprise means for supporting the inner edges of a substantially annular digester top, for instance: A center shaft, pier, or column, in the digester arranged to support a framework which, by means of hangers therefrom, in turn supports the inner ends of digester roof-bearing members whose outer ends are supported by the digester wall. This invention is broad enough to comprehend other features which comprise an arrangement of sludge-discharging mechanisms to readily conform to the above described roof design, and which also may comprise a housing for the pier, or extensions thereof, and the motivating elements of the sludge discharge mechanism. This housing is preferably supported from said pier.

The arrangement of sludge discharge mechanism comprehended by this invention may be described as a tubular or drum-like element surrounding the shaft, pier, or column, which upstands from the digester bottom. The drum is revolubly suspended or supported from adjacent its upper end and is rotated by suitable motivating devices, obtaining their support either directly or indirectly from the central pier. The drum carries sludge scrapers or impellers extending from its lower portion. It may also have scrum breakers extending from its upper portion. The idea being that the pier is used jointly to support the motivating devices and to support the revoluble drum encircling said pier for carrying the sludge discharging impellers.

The invention is illustrated in the accompanying drawings by showing one embodiment of our invention. This embodiment is used for illustrative purposes only for obviously many changes and modifications can be made therein without departing from the spirit of our invention as described herein and pointed out in the appended claims. The embodiment chosen for this purpose is a sewage digester but the invention is capable of other uses, such as in sedimentation apparatus generally, so the use of the invention is not intended to be limited to any specific field.

In the drawings, Fig. 1 is a vertical sectional view through our sewage digester, with parts broken away.

Figure 5:
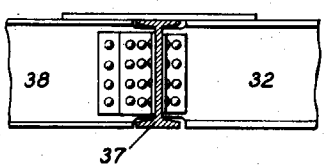

Fig. 2 is a horizontal sectional view taken along lines II—II in Fig. 1 while Fig. 3 is a vertical sectional view taken along lines III—III in Fig. 1. Fig. 4 is a plan view of the digester with parts broken away. Fig. 5 is a vertical sectional view taken along lines V—V in Fig. 4.

So that the invention may be more clearly understood the parts shown in the accompanying drawings will be described. The numeral 11 indicates a sedimentation apparatus such as a sewage digester. 12 indicates the side or boundary walls thereof and 13 its bottom. 14 indicates a sludge discharge hopper, preferably annular in shape having a sludge outlet 15. 16 indicates a shaft, column, or pier upstanding from the digester bottom. In large sizes of tanks, a concrete pier is preferred but in smaller sizes a metal shaft can be used.

The manner of constructing and supporting the digester top 17 forms an important part of this invention so it will now be described. The principle thereof is to have either the central pier 16 or an extension thereof, support a framework. Hangers or slings depend from said framework and support inner ends of roof beams, the other ends of which find a bearing upon the digester walls 12. More particularly, the column or pier 16 is provided with an extension 18. In smaller sizes of digesters, the pier or shaft itself can extend above the digester top sufficiently to directly support the framework but in the embodiment shown the metal extension 18 is used. This extension is formed of various shaped beams 18, angle bars 20, and braces 21, as shown in Fig. 2, in any manner which gives the extension 18 sufficient strength. 22 indicates a reinforcing to withstand compressional strains put on the extension as will be described hereinafter. The top framework supported by the pier 16, or its extension 18, may be any framework suitable for sustaining the roof-supporting hangers which depend therefrom but in the present embodiment the frame comprises a substantially horizontal plate or cap piece on the extension 18 having a web piece 24 associated therewith. Secured to the web piece 24 are beams 25, and these beams are secured at the outer ends to webs 26. Stretching between the webs 26 and fin plates 27 carried by extension 18 and radially extending therefrom are compression beams or spreaders 28 while 29 indicates hanger beams or straps or sling members depending from the webs 26 of the top framework, which are arranged to support the digester roof. A roof 30 may be provided over the top framework, and a housing 31 or side walls may be provided to enclose the pier extension 18 and the top framework to make it more sightly and to protect it from the weather.

The digester roof is formed of beams 32 preferably radially arranged from the pier 16 having their outer ends resting on the digester boundary wall or walls 12. Adjacent to the inner ends of the said top beams 32, they are secured to the hangers 29 whereby their inner ends may thus be supported. Some of the top beams 32 or extensions 33 thereof, extend inwardly and terminate adjacent to the pier 16 to form a platform encircling the pier 16 and within the housing 31. These top beams 32 may have chordal bracing beams 37 for making the digester top structure more rigid. Over the top beams 32 is placed some top structure such as concrete 34. Concrete 35 may also be used in the housing 31 to encase the hangers 29 and plates 36 therebetween (Fig. 4).

Having thus described the construction of our digester top whereby the use of the usual trusses are eliminated, there will be now described the arrangement of sludge discharge mechanism contemplated by this invention adapted to cooperate with the central column or pier, since that pier serves such an important function in our digester top design.

Solids settled by sedimentation in a sedimentation apparatus such as a digester, are usually impelled toward a central annular sludge discharge hopper or outlet, by means of substantially radial arms 40 carrying rakes 41 presenting a curved face to the sludge. Similarly in digesters, radial scum-breaking arms 42 are provided adjacent the top of the digester. The radial arms 40 and 42 heretofore have usually been rotated by a supporting vertical shaft driven from above the digester.

However, in the present design of digester top which requires a central support, the central vertical shaft cannot be used. In lieu thereof, this invention involves the use of a revoluble shell or drum 43 encircling the stationary column or pier 16. The drum may be apertured as at 44 in order to lighten it without sacrificing strength and it may be appropriately reinforced either longitudinally as at 53 or annularly, or both, to withstand thrust or compressional tendencies from the rake arms 40. The drum is hung or depends from a support adjacent its upper end from whence it is driven by a suitable motor and gearing located in juxtaposition thereto. That is to say, a motor 45 is suitably connected to a speed reducer 46 and drives a gear 47, such as a worm gear, meshing with a coacting bull or ring-gear 48 secured to the drum 43. This ring-gear 48 is floated upon pier-supported anti-friction bearings, that is, the ring-gear is suitably mounted for rotation upon ball or roller-bearings supported on a casting 50 carried by the pier 16. The pier and the drum of the sludge discharge mechanism fill or close the aperture in the digester top. To prevent gas from the digester creeping up along the drum 43, one or more water or oil-seals may be provided such as an inner and an outer-water seal provided at 51 and 52 respectively.

The location of the motor and its gearing is considered important in that it owes its support to the central pier 16.

It will thus be seen that by means of this invention a sewage digester is provided from which the present unsightly trusses have been eliminated and wherein an attractive housing takes their place. The arrangement of the top with its central column having the combined functions of supporting the digester top beams and the sludge discharge mechanism, produces an efficient digester which is also reasonable in its construction costs.

It will be manifest that the digester construction is such as to provide a receiving and holding space for sewage sludge while undergoing digestion and that within the digester under the roof thereof and immediately above the body of sludge undergoing digestion there is left what is frequently referred to as a gas receiving and collecting space. From the foregoing it will be noted that the casting 50 which is carried by the pier 16 in fact constitutes the main supporting member of a turntable construction or assembly, and that this main member provides an annular raceway or bearing along which anti-friction rollers run and whereby the annular bull ring gear 48—which may be referred to as a movably supported turntable member—is rotatably supported and guided through the intermediary of said anti-friction rollers.

It will be noted that the construction described in fact provides a means extending upwardly from the apex portion of said pier through the space within the annular raceway and more particularly through the annular bull ring gear or movably supported turntable member to the region of the top or roof of the digester whereby the central or apertured section of the apertured top or roof derives support from the pier. Also that the stationarily mounted motor and the speed reducing and power transmitting mechanism between the rotor of the motor and the rotatable turntable member or annular bull ring gear derive support by or from said pier.

It will be also noted that the depending drum or revolving shell 43 may be broadly viewed as a pier-encircling structure and may be referred to as a vertically-extending rotatable arm carrying structure or element that turns about a vertically-extending axis and that provides means by which the laterally or outwardly extending arm construction is supported so as to have horizontal rotary movement in the space between the roof of the digester and the tank bottom thereof, that said rotatable arm carrying structure 43 extends and operates through the space left between the pier on the one hand and the section defining the apertured portion of the top on the other hand, and that said rotatable arm carrying structure 43 also carries what may be referred to as a closure member, as a top member or as a sealing cap and which is provided by a member having an annular top or cap portion with marginal or outer and central or inner depending flanges that dip into liquid whereby a gas-tight liquid type of seal is provided as between said rotatable carrying structure and the stationary sections or portions of the tank whereby the outflow of gas from the gas receiving space of the digester past said revolvably carrying structure is prevented as by preventing the flow of gas from the space within said cap member downwardly along the flange portions thereof and thence laterally outwardly past the lower edge portions of the flanges.

It is also to be noted that the pier-encircling structure 43 serves as a sole member through the medium of which the radial scum arms 42 and the radial sludge discharge or solids raking arms 40 are carried and rotated. In other words, this drum or pier-encirling structure 43 carries the entire weight and transmits all of the turning forces required for the carrying of the arms mentioned and for the turning of the same about the pier. The arms 40 and the raking blades 41 carried thereby constitute what is referred to as bladed arms constituting settled solids raking elements. They function incident to a turning thereof about the pier to effect a transfer or impelling of settled solids from diverse sections of the digester or tank bottom into the hopper 14 constituting a settled solids receiving section from which the solids pass through the discharge pipe 15.

We claim:

1. A digester having in combination, a boundary wall, a bottom provided with a sludge outlet, a stationary pier upstanding from the digester bottom, a frame element supported from said pier above the digester, a plurality of tension members depending from said frame, a plurality of beams with one end thereof supported by said boundary wall and the other end thereof secured to one of said tension members, digester top sustained by said beams, rotatable settled sludge raking mechanisms encircling said pier, and a motor mechanism supported from said pier above said digester for driving said sludge raking means.

2. The structure according to claim 1 in which said beams extend radially from said pier.

3. The structure according to claim 1 in which said top is annular and encircles said pier, and said frame supports a housing adapted to enclose the central opening of said annular top.

4. A digester having in combination a boundary wall, a bottom provided with a sludge discharge outlet, a pier upstanding from said bottom, a raftered frame supported from said pier above the digester, substantially horizontal compression members extending between said frame and said pier, reinforcements embodied in said pier to withstand compression of said pier by said members, sling devices co-acting with said frame, beams supported at one end from said sling devices and at the other end by said wall, a digester top sustained by said beams, rotatable means for causing digested sludge to discharge from said outlet and motor means external of said digester for rotating said rotatable means.

5. The structure according to claim 4 with the addition of chordal braces between said beams.

6. A sewage digester having in combination a boundary wall, an apertured top having its periphery supported from said wall, a sludge discharge outlet though the bottom of said digester, a stationary central pier projecting through said apertured top and supporting said top, a sludge raking mechanism operating through said apertured top for impelling settled sludge to said outlet, and motor means for propelling said sludge raking mechanism, said pier and said sludge raking means closing the aperture in said top.

7. A sewage digester having a bottom, an enclosing wall, an apertured top having its periphery bearing upon said wall, a sludge outlet, a central pier extending above said digester through said apertured top, a rotatable drum encircling said pier, sludge raking mechanism carried by said drum, motor mechanism for rotating said drum; and means for supporting said top and said motor mechanism from said pier comprising tension elements from which said top depends, and a frame on said pier from which said tension elements depend, said motor mechanism owing its support to one of said elements.

8. A sewage digester having a bottom, a boundary wall, an apertured top having its periphery supported from said wall, a sludge outlet in said bottom, a central pier extending above said digester top, a drum rotatably suspended from said pier, sludge raking mechanism carried by said drum, motor mechanism supported from said pier above said apertured top for rotating said drum, and a frame for supporting the inner apertured portion of said top also sustained from said pier.

9. The structure according to claim 8 in which said drum is apertured to lessen its weight.

10. The structure according to claim 8 in which said drum is provided with scum breaking means.

11. A digester comprising a boundary wall, a bottom, a sludge outlet, a gas-tight top, a central pier supporting said top, sludge discharge mechanism having a rotatable drum of less length than the height of said pier encircling said pier and deriving its support therefrom, a ring gear on said drum, a motor adjacent to said pier located above said top for accessibility, and a drive connection between said motor and said drum.

12. A digester comprising a boundary wall, a bottom, a sludge outlet, a gas-tight top; a central pier supporting said top, sludge discharge mechanism having a rotatable drum encircling said pier and deriving its support therefrom extending through said gas-tight top, a liquid seal associated with said drum to prevent escape of digester gases therealong, and motor mechanism for driving said drum.

13. A sludge discharge operating mechanism for a sedimentation tank comprising an upstanding pier in the tank, a flanged ring rotatably mounted on said pier, a drum depending from said ring, a motor deriving support from said pier, a driving gear connection between said motor and said ring for rotating said ring and its depending drum, and sludge rakes operated by rotation of said drum.

14. A sludge discharge mechanism for sedimentation tanks comprising an upstanding pier in the tank, a rotatable drum-like element supported from and encircling said pier, sludge rakes operated by rotation of said drum, a ring gear associated with said drum, a stationary motor deriving support from said pier, and a gear connection between said stationary motor and said ring gear for rotating said drum through the medium of said ring gear.

15. Apparatus of the type described comprising a sedimentation tank, an upstanding pier in said tank, a rotatable element supported from and encircling said pier, sludge rakes operated by rotation of said element, a ring associated with said element, a platform mounted from said pier, a stationary motor deriving support from said platform, and a drive connection between said motor and said ring for rotating said element through the medium of said ring.

16. Sedimentation apparatus provided with a tank having a boundary wall, a bottom on which settling solids can accumulate formed with a discharge section, a pier upstanding from said bottom, and mechanism for impelling the solids settled on the tank bottom to said discharge section, comprising in operative relationship a stationary motor; a speed reducing arrangement driven by said motor; a turntable assembly deriving support from said pier and having an annular bearing member through and above which said pier extends; a pier-encircling structure carried by and depending from the rotatably supported bearing member of the rotatable turntable assemblage, settled solids engaging devices travellable with said rotatably supported turntable bearing member including free outer ended arms extending laterally and supported from said depending pier-encircling structure and provided for impelling the settled solids from diverse parts of the tank bottom; and a fixed rigid element forming a framework supported from said pier, extending laterally therefrom and affording means whereby said motor and said speed reducing arrangement derive support from said pier, and below which framework there is located said settled solids engaging devices.

CLARENCE E. KEEFER.
FRANK C. WACHTER.